INVENTOR
Robert E. Briggs
BY Bacon & Thomas
ATTORNEYS

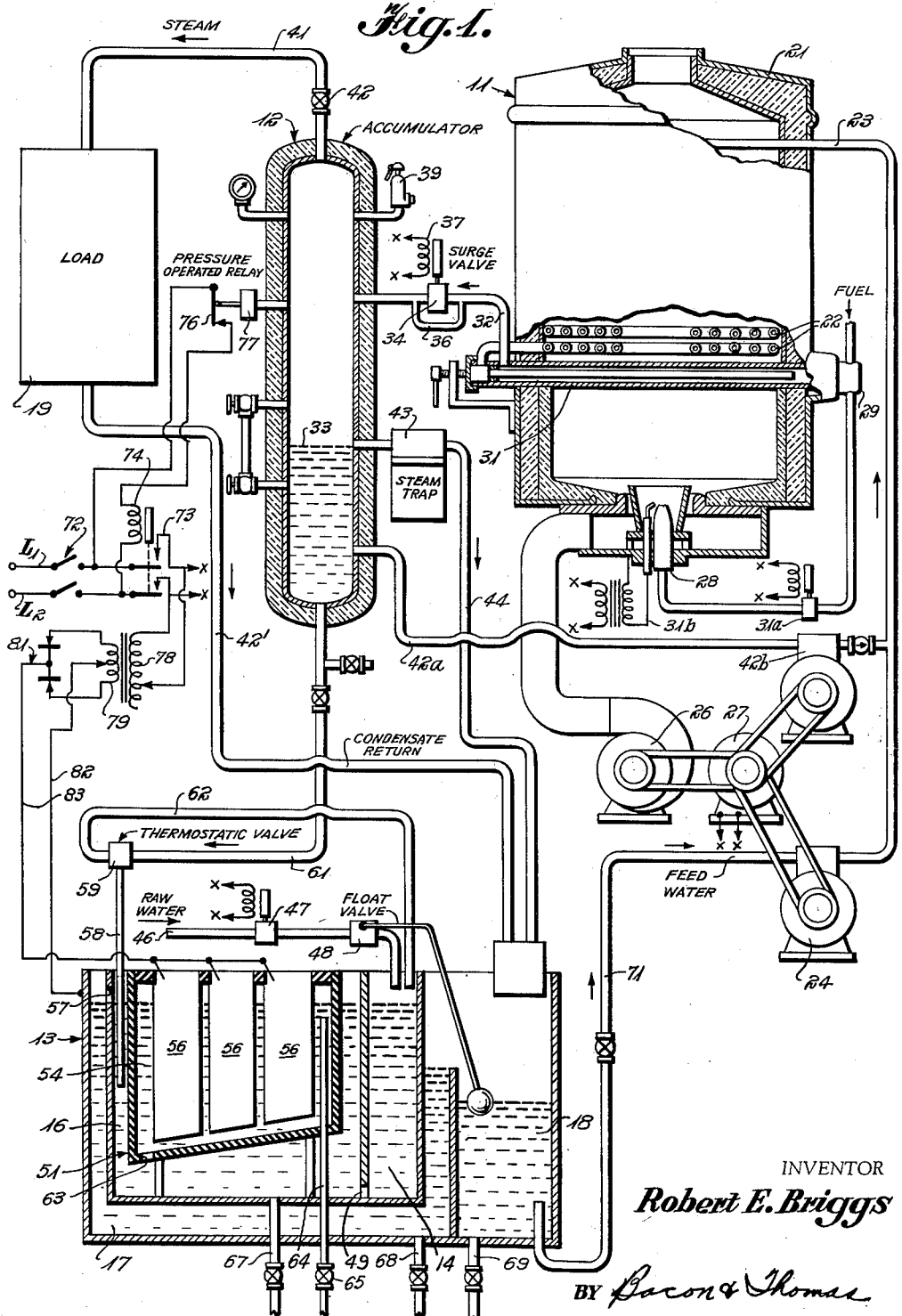

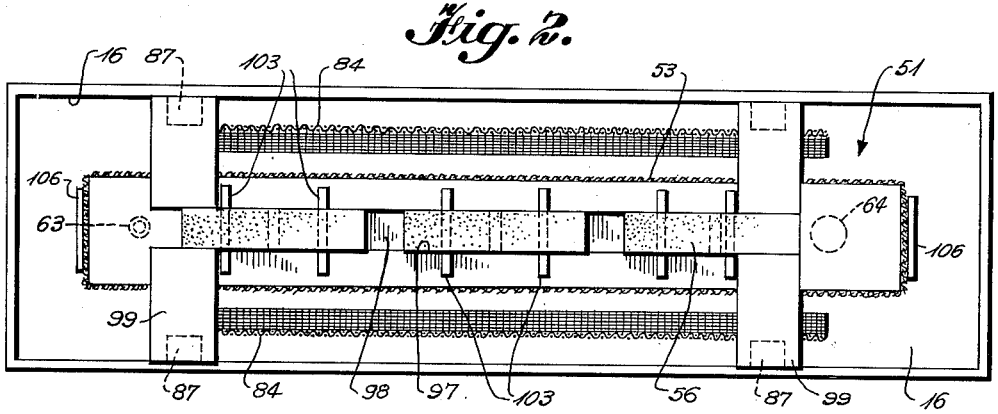
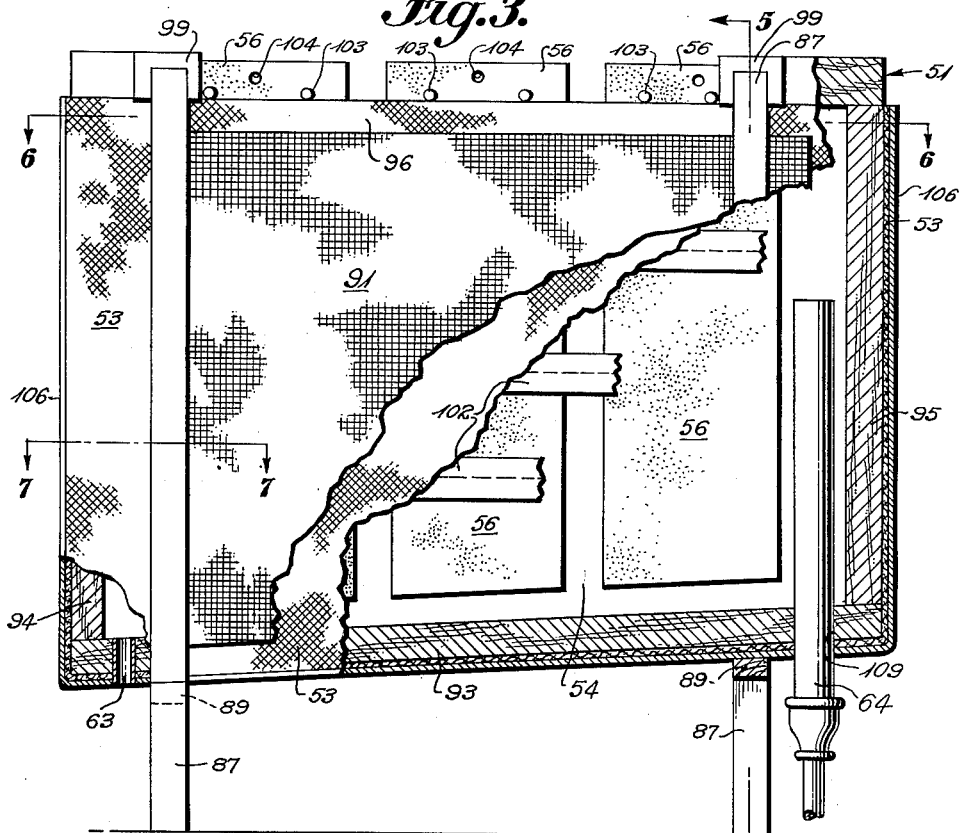

June 22, 1954

R. E. BRIGGS 2,681,885

ELECTROLYTIC METHOD FOR TREATING WATER

Filed May 24, 1950

INVENTOR

*Robert E. Briggs*

BY *Bacon & Thomas*

ATTORNEYS

Patented June 22, 1954

2,681,885

UNITED STATES PATENT OFFICE 2,681,885

ELECTROLYTIC METHOD FOR TREATING WATER

Robert E. Briggs, Los Angeles, Calif.

Application May 24, 1950, Serial No. 163,936

8 Claims. (Cl. 204—151)

This invention relates to a method and apparatus for treating water, and more particularly, to a method and apparatus for treating boiler feed water so as to prevent the formation of adherent scale in boilers when the water supply contains scale producing materials and to remove materials causing corrosion of the interior surfaces of boilers.

As is well known, raw waters available for boiler supply frequently contain substantial amounts of hardness producing materials. Upon concentration of the hardness producing materials in the water in the boiler due to evaporation of water, hardness producing materials are precipitated and are deposited as scale on the heated surfaces in contact with the water.

Calcium compounds or magnesium compounds or both may be present and when such compounds are sulfates, carbonates or bicarbonates, adherent coatings of magnesium and calcium carbonate or calcium sulfate deposit on surfaces in the boiler, the bicarbonates present being converted into carbonates upon heating of the boiler feed water. In some cases, silica may also be present in substantial amounts so as to cause deposition of adherent scales containing silica. Chlorides may also be present but do not enter into scale formation although such chlorides as well as sulfates in the boiler feed water may cause corrosion. Alkali metal compounds, particularly sodium compounds, are usually present in small amounts but are not deleterious unless present in sufficiently large amounts to cause foaming or priming.

In accordance with the present invention, the incoming raw water is subjected to cathodic treatment in a two-compartment diaphragm type of electrolytic cell. The electrolytic treatment under the conditions of the present invention reduces the scale forming materials to an amount below that at which any substantial scale forms and also removes sufficient corrosion producing materials from the water to substantially eliminate corrosion of boiler elements. The treatment of the raw water in the cathode compartment of a diaphragm type electrolytic cell causes the water being treated to become alkaline and the resultant precipitation of magnesium and calcium compounds insoluble in the alkaline catholyte. Calcium carbonate precipitates at a pH of approximately 9.5 to 10.5 and magnesium hydroxide at a pH of approximately 11 to 11.5. Bicarbonates are converted into carbonates in the alkaline catholyte so as to further the precipitation of calcium carbonate. At the same time corrosion causing materials such as sulfates and chlorides concentrate in the anode compartment of the cell and are discharged from the system. A portion of the silica which is present is also removed although the manner in which it is removed is not entirely understood. The precipitate formed in the cathode compartment is settled or otherwise separated from the treated water. Water delivered from the water treating system to the boiler is alkaline but the alkalinity of the water has no deleterious effect upon the operation of the boiler. Very little precipitation of solids takes place in the boiler and any precipitates which may form in the boiler are flocculent precipitates which remain in suspension in the water so that no substantial amount of scale is deposited.

An important feature of the present invention is the return of concentrated boiler water from the boiler to the electrolytic treating system. The concentrated boiler water thus returned is highly alkaline as the content of alkaline compounds including alkali metal compounds in the boiler feed water has been increased by the evaporation of water in the boiler. By mixing returned concentrated boiler water with incoming raw water, the alkalinity of this water is increased so as to reduce the load on the electrolytic cell. That is to say, less electric power is consumed in producing the alkalinity in the cathode compartment required to precipitate calcium and magnesium compounds. Since alkali metal compounds are not removed as part of the precipitate formed in the cathode compartment, the return of concentrated boiler water to the treating system tends to cause the concentration of alkali metal compounds in the system to build up. This is favorable to the operation of the system providing the concentration of such compounds does not become excessive. In the preferred system of the present invention, the anolyte supply is from the cathode compartment of the electrolytic cell such that alkali metal compounds are carried into the anode compartment. Since anolyte is discharged to waste, there is an effective removal of a portion of the alkali metal compounds from the system. The system tends to reach a balanced condition, i. e., the concentration of alkali metal compounds in the circulating system reaches and does not exceed a given concentration under steady operating conditions.

The increased concentration of electrolytes in the water fed to the cathode compartment of the electrolytic cell due to the return of concentrated boiler water increases the average conductivity of the catholyte to also reduce the required electric power consumption. The return of concentrated boiler water also enables the amount of waste from the anode compartment to be reduced. The alkaline catholyte supplied from the cathode compartment to the anode compartment becomes acidic during its passage through the anode compartment. However, the increased concentration of soluble alkaline compounds therein due to return of concentrated boiler water reduces the rate at which it becomes acidic and reduces the amount which must be discharged to prevent the anolyte from becoming too acid.

The discharge of the anolyte from the anode compartment as waste is preferably regulated so as to maintain the pH of the discharged material close to but above approximately 1.5. When the concentrations of electrolytes particularly those of alkali metal compounds are quite small, as is usually the case in water softening operations where no concentrated boiler water is returned to the electrolytic cell, it has been found that the pH of the anolyte should not be allowed to fall below approximately 2, otherwise the pH of the catholyte cannot be maintained sufficiently high to effectively precipitate magnesium hydroxide. However, the increased concentration of electrolytes due to return of concentrated boiler water in the present process enables the pH of the discharged anolyte to be reduced to approximately 1.5 without adversely affecting the required high pH of the catholyte in the cathode compartment. The lower pH of the discharged anolyte which can usually be employed in the present process is a further factor which enables the anolyte waste to be reduced. The anolyte can be discharged, however, at a higher pH by increasing the anolyte waste without impairing the operation of the cell and in some cases this may be desirable in order to increase the amount of dissolved solids discharged from the system.

Return of concentrated boiler water to the electrolytic step has another advantage in that the concentrated water from the boiler is ordinarily at a relatively high temperature and the temperature of the electrolyte in the electrolytic cell is thereby increased. Increasing the temperature of the electrolytes in the cell within the range contemplated by the present invention, does not materially increase the solubility of the insoluble magnesium and calcium compounds in the alkaline catholyte. Furthermore, the increased temperature increases the conductivity of the electrolytes in the cell so as to also decrease the necessary electric power consumption for adequate water treatment. Also substantially all of the heat removed from the boiler due to return of heated concentrated boiler water is recovered when the heated water after treatment is returned to the boiler. The withdrawal of concentrated boiler water provides a continual blowdown of the boiler and any solids precipitated in the boiler are continuously removed and settled out of the system.

It is therefore an object of the present invention to provide an improved process and apparatus for softening water.

Another object of the invention is to provide an improved process and apparatus for electrolytically treating boiler feed water to remove scale forming materials therefrom.

Another object of the invention is to provide a method and apparatus for electrolytically treating boiler feed water to remove scale forming materials and corrosion producing materials therefrom in which concentrated boiler water is recirculated in the system.

A still further object of the invention is to provide a boiler system in which highly alkaline concentrated boiler water is mixed with raw water containing scale forming ingredients to condition it for electrolytic treatment for the removal of such scale forming ingredients.

Other objects and advantages of the invention will appear from the following description of preferred embodiments shown in the attached drawings, of which:

Fig. 1 is a diagrammatic view of a boiler system in accordance with the present invention employing a flash type boiler;

Fig. 2 is a plan view of an electrolytic cell suitable for employment in the present invention;

Fig. 3 is a side elevation with parts broken away showing the internal cell structure of Fig. 2;

Fig. 10 is a horizontal cross-section taken on the line 10—10 of Fig. 9.

Figure 4:
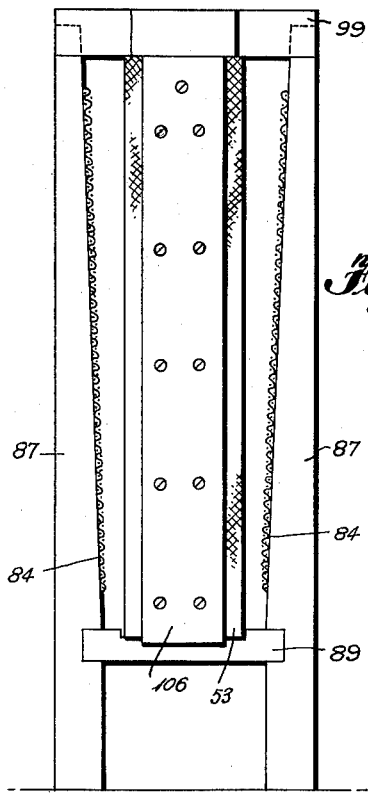
Fig. 4 is an end elevation of the device of Fig. 3.
Figure 5:
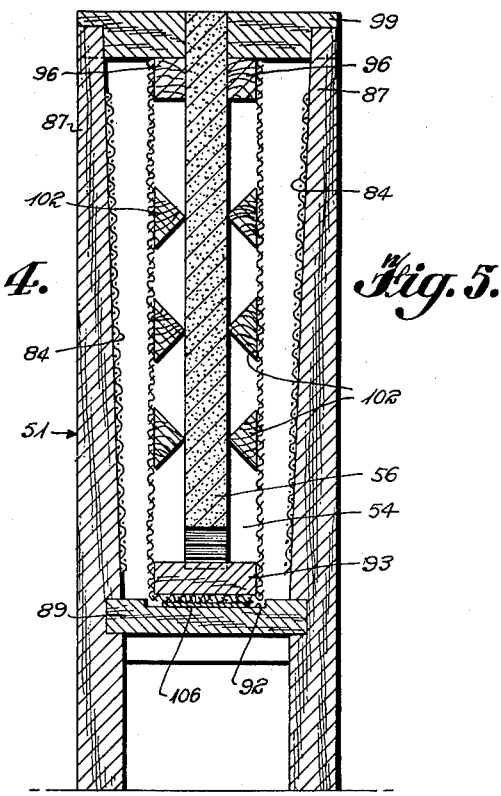
Fig. 5 is a vertical elevation of the device of Fig. 3 taken on the line 5—5 of Fig. 3.
Figure 6:
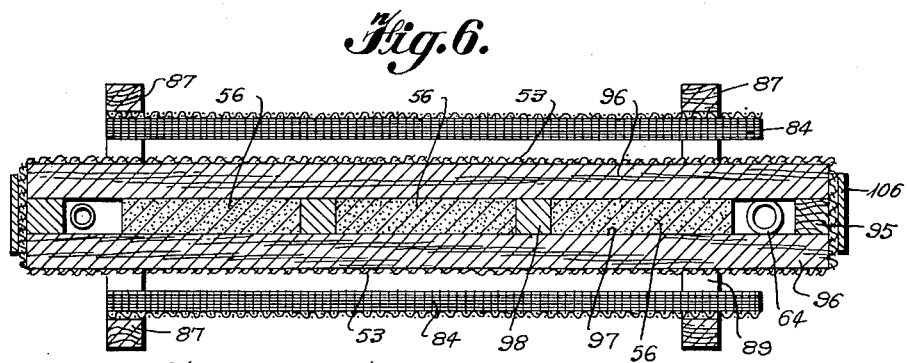
Fig. 6 is a horizontal elevation taken on the line 6—6 of Fig. 3.
Figure 7:
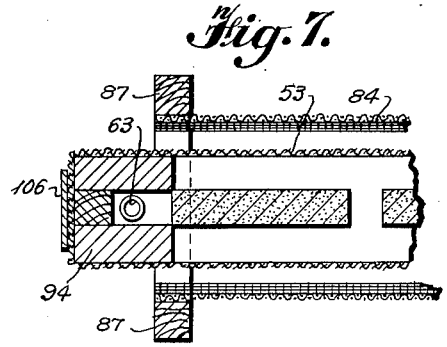
Fig. 7 is a fragmentary horizontal elevation on the line 7—7 of Fig. 3.

Referring more particularly to the drawings, Fig. 1 illustrates a water treating system in accordance with the present invention. This system may include a boiler 11 of the flash type provided with an accumulator 12 for separation of steam from water. The system may also include a water treating tank 13 providing a mixing compartment 14, an electrolytic treating compartment 16, a settling compartment 17 and a boiler supply compartment 18. The system may also include any suitable type of load 19 which is furnished with steam from the accumulator 12 and from which any condensate which may be recovered is returned to the boiler supply compartment 18. The details of the boiler 11 are not a part of the present invention but the boiler may include a heat insulated casing 21 in which is positioned a coil 22 into which water is introduced through a pipe 23 from a feed water pump 24. The boiler may also be provided with a blower 26 and both the pump 24 and blower 26 may be driven by a motor 27. The boiler may also be provided with a burner structure 28 and fluid fuel may be supplied to the burner 28 by a thermostatically actuated fuel valve indicated at 29, which valve is under control of a thermostatic structure 31. The details of the valve 29 and thermostatic structure 31 also are not a part of the present invention, although it may be stated that the thermostatic structure 31 is responsive to both the temperature of the products of combustion from the burner 28 and the temperature of the steam and water mixture leaving the boiler 11. The boiler may also be provided with a solenoid operated fuel valve 31$^a$ which is open when its operating coil is energized and with an ignition device 31$^b$.

When the boiler is in operation, a steam and water mixture is discharged from the boiler 11 through a pipe 32 into the interior of the accumulator 12 above the water level 33 therein. The pipe 32 may be provided with a solenoid operated surge valve 34 having a by-pass 36 of relatively small diameter. The details of the surge valve also form no part of the present invention, it being sufficient to state that the valve 34 may be opened by energization of the solenoid coil 37 and closed when the coil 37 is deenergized. The accumulator 12 may also be provided with a conventional pressure relief or safety valve 39. The accumulator enables separation of water from steam, the steam being delivered from the accumlator through a pipe 41 under control of a manually operable valve 42 to the load 19. The load 19 may be of any type and if condensate is recovered it may be returned through a pipe 42' to the boiler feed compartment 18 of the treating tank 13. Water separated from the steam in the accumulator is concentrated boiler water in that the concentration of any soluble solids fed to the boiler in the feed water is increased. A substantial portion of the concentrated boiler water is ordinarily recirculated directly back to the boiler through a pipe 42ᵃ by a recirculating pump 42ᵇ driven by the motor 27 and delivering the returned concentrated boiler water into the pipe 23. In normal operation of the system shown in Fig. 1, the concentrated boiler water level 33 is maintained at substantially the level shown in Fig. 1, by withdrawal of water through a steam trap 43 and delivering such water through a pipe 44 into the boiler feed compartment 18 of the treating tank 13. The steam trap prevents live steam from being discharged from the accumulator 12 through the pipe 44.

Raw water to be treated before it is introduced into the boiler as make-up water may be supplied through a pipe 46 having a solenoid operated valve 47 and float valve 48 therein. The solenoid operated valve 47 is open whenever the system is in operation and the float valve controls the introduction of raw water into the mixing compartment of the treating tank 13 in accordance with the boiler demand as determined by the level of the water in the boiler feed compartment 18. The concentrated boiler water will ordinarily be at a relatively high temperature and a substantial amount is admixed with the incoming raw water as described below so as to increase the temperature of the water in the mixing compartment above that of the raw water while at the same time increasing the alkalinity of the water entering the treating cell. The mixture of raw water and concentrated boiler water at an elevated temperature flows from the mixing compartment 14 into the treating compartment 16 through an aperture 49.

The treating compartment 16 constitutes the cathode compartment of an electrolytic cell, the details of which are more clearly shown in Figs. 2 to 7, inclusive. The cathode compartment 16 contains a diaphragm and electrode structure 51 having a frame structure of insulating or poorly conducting material supporting a diaphragm 53 separating the cathode compartment 16 from an anode compartment 54 containing a plurality of anodes 56. The water supplied to the boiler, however, passes through the cathode compartment only and is discharged therefrom through an overflow orifice 57 into the settling compartment 17 of Fig. 1.

A thermostatic member 58 may extend down into the cathode compartment 16 and actuate a thermostatic valve 59. The thermostatic valve 59 may control the discharge of concentrated boiler water from the lower portion of the accumulator 12 into the mixing compartment 14 of the treating tank 13. In other words, a pipe 61 may lead from the lower portion of the accumulator 12 to the valve 59 and a pipe 62 may lead from the valve 59 to the mixing compartment 14. When the temperature of the water being discharged from the cathode compartment 16 falls below a predetermined temperature, the thermostatic valve 59 will open or partly open to introduce concentrated boiler water into the mixing compartment 14 and will close when the temperature of the water leaving the cathode compartment exceeds a predetermined temperature.

The supply of liquid to form the anolyte in the anode compartment 54 is from the cathode compartment 16 through an aperture 63 in the lower portion of the anode compartment and anolyte flows upwardly and to the right through the anode compartment and is discharged through a pipe 64 provided with a manually controlled valve 66. The various compartments in the treating tank 13 may be provided with clean-out conduits. That is to say, the cathode and mixing compartments 16 and 14, respectively, may be provided with a clean-out pipe, the settling compartment 17 may be provided with a clean-out pipe 68 and the boiler feed compartment 18 may be provided with a clean-out pipe 69, all of the pipes 67, 68 and 69 being provided with manually operable valves. Boiler feed water may be withdrawn from the boiler feed compartment 18 by the pump 24 through a pipe 71.

The motor 27 as well as the solenoid operated valves 31ᵃ, 34 and 37 and the ignition device 31ᵇ may be supplied from a common source of electric power represented by the lines L₁ and L₂. Power for electrolytic treatment of the water may also be supplied from the same source. Thus, upon closure of the manual switch 72, electric power is delivered to the solenoid valves, ignition device 31ᵇ, and motor through the conductors marked X—X whenever the relay 73 is closed. The relay 73 is normally open but is immediately closed by energization of its coil 74 when the manual switch 72 is closed, the relay coil 74 being connected in series with contacts 76 of a pressure operated relay 77 which contacts are normally closed. The pressure operated relay is opened whenever the pressure in the accumulator 12 exceeds a predetermined value, thereby opening the relay 73 and disconnecting all electric power from the system to shut down the system.

The closing of the relay 73 may also energize the primary 78 of a rectifier transformer, the secondary 79 of which is shown as being connected through a full wave rectifier 81 and conductors 82 and 83 to the anodes 56 and to the tank 13, respectively. It will be understood that the positive terminal of the rectifier 81 will be connected with the anodes 56 and that the negative terminal will be connected to the cathodes 84 of Figs. 2 to 6 which will be grounded to the tank 13.

The details of a suitable electrolytic cell structure are more clearly shown in Figs. 2 to 7, inclusive. The electrolytic cell may consist of a unitary electrode and diaphragm structure, indicated generally by the reference numeral 51, which may be inserted or lifted bodily from the cathode compartment 16. The walls of the cathode compartment may be of any suitable metal such as iron and may form part of the treating tank 13. The electrode and diaphragm structure 51 may include vertical support members 87 at the sides thereof and near the ends of the structure. These support members may have the cathode 84 secured to their inner edges in any suitable manner. The cathodes are preferably of screen formation, such as ordinary hardware cloth, having sufficient rigidity to be self-supporting between the supports 87 and may be of any suitable metal such as iron. The support members 87 may have cross-members 89 extending between adjacent pairs of support members upon which a diaphragm and anode structure 91 may rest. The diaphragm and anode structure 91 is preferably received in notches 92 in the upper surfaces of the cross-members 89.

The diaphragm and anode structure 91 may include a bottom member 93 extending longitudinally of the structure and vertically extending channel members 94 and 95 (Fig. 7) secured to the bottom member 93 and extending upwardly at the two ends of the anode and diaphragm structure. Longitudinally spaced top members 96 may be secured to the channel members 94 and 95 so as to provide a longitudinally extending slot 97 for the reception of a plurality of anodes 56, spaced from each other by members 98 secured to the top members 96 in the slot 97. Laterally extending top members 99 may be suitably secured to the tops of the vertically extending support members 87 and also to the tops of the longitudinally extending members 96 so as to center the anode and diaphragm structure between the cathodes 84. The bottom member 93 with the two channeled members 94 and 95 and the two top members 96 provide a frame to which the diaphragm 53 may be secured so that the members referred to and the diaphragm provide an enclosed anode compartment which may be the anode compartment 54 of Fig. 1. The diaphragm 53 may be of any suitable permeable material, a heavy cloth such as canvas ordinarily being employed. In order to further support the diaphragm 53, a plurality of triangular members 102 extending longitudinally of the anode and diaphragm member between the channeled members 94 and 95 may be provided. These triangular members may have one of their faces positioned against the diaphragm 53 and present an angular portion to the anodes 56.

The anodes 56 may be of any suitable conducting material not attacked by the acidic anolyte, a preferred material being graphite. The anodes may be supported from the top members 96 by means of dowel members 103 extending through apertures in the anodes and having their ends resting upon the top members 96. The anodes may also be provided with apertures 104 providing for suitable electrical connection to the anodes. The diaphragm 53 may be wrapped around the frame of the anode compartment so as to be overlapped at the ends and a strap 106 of any suitable metal such as iron may extend along the ends of the anode and diaphragm structure and along the bottom thereof. The strap 106 may be secured to the channeled members 94 and 95 and bottom member 93 in any suitable manner such as by wood screws 107. The strap 106 holds the diaphragm securely in position and may be electrically connected to the cathodes 84 and to the metal tank in which the electrode structure is positioned. Any metal fasteners (not shown) such as screws for securing the various structural elements of the frame of the electrode and diaphragm structure together and positioned below the liquid level in the cell are also electrically connected to the cathodes as otherwise they will be rapidly corroded by electrolytic action.

It will be apparent that the diaphragm and support members therefor provides an open-topped anode compartment 54 separated from the cathode chamber 16 by the diaphragm 53. The anode compartment 54 receives its supply of electrolyte, however, from the cathode compartment 16 through an aperture 63 in the bottom member 93, such aperture extending also through the diaphragm 53 and strap 106. Discharge of anolyte from the anode chamber 54 may be through an upstanding pipe which may be the pipe 64 of Fig. 1. The pipe 64 may extend upwardly into the anode chamber from the cathode chamber through an aperture 109 in the bottom member 93 of the anode and diaphragm structure, the pipe 64 fitting the aperture 109 relatively closely so that substantially all of the flow of liquid into the anode compartment 54 is through the aperture 63. The portion of the pipe 64 extending into the anode chamber may be of any suitable non-conducting material which will not be corroded by the acidic anolyte. For example, such pipe may be of hard rubber, synthetic rubber, etc. The members forming the frame of the electrode and diaphragm structure 91 may be of insulating or poorly conducting material, a suitable material being wood.

It will also be apparent that the anodes 56 may be individually lifted from the anode compartment and that the entire electrode and diaphragm structure 91 may be also lifted as a unit from the cathode compartment 16 for inspection, cleaning and repair. The pipe 64 may be secured to the treating tank 13 of Fig. 1 and remain affixed thereto. The bottom of the anode compartment is preferably given a slight inclination, as shown mostly clearly in Fig. 3, toward the aperture 63, so that any solids deposited therein may be easily flushed from the anode compartment through such aperture.

In operation of the system of Fig. 1, the entire treating tank 13 including all of the compartments therein may initially be filled with raw water up to the level where the float valve 48 closes. The switch 72 may then be closed and the system put into operation. Raw water is initially fed directly to the boiler but the amount of scale forming material thus introduced into the boiler is inconsequential. If available, the tank 13 may be initially filled with treated water from another unit or by manual manipulation the electrolytic cell may be employed to treat the raw water during initial filling of the tank 13. The electrolytic cell will operate on raw water at any usual raw water temperatures but at reduced efficiency. Conditions of water treatment will, however, rapidly improve as soon as concentrated boiler water at an elevated temperature begins to be returned to the electrolytic cell and the system will approach a balanced condition. The valve 65 in the anolyte discharge pipe 64 is adjusted so that the pH of the waste anolyte is above 1.5 when the system is operating. Under these conditions, the pH of the catholyte discharged from the cell into the settling compartment will be in the neighborhood of 11 to 11.5. Raw water is then automatically introduced into the mixing compartment 14 under control of the float valve 48 at a rate just compensating for the water lost in the system, most of which occurs in the load 19. A small amount of water is, however, lost in the anolyte waste through the pipe 64. Condensate recycled through the system does not pass through the treating cell but a substantial amount of concentrated boiler water recycled through the system does pass through the electrolytic cell to both increase the temperature and the alkalinity of the water fed to the cell. Ordinarily, the system is adjusted so that considerably more water is separated in the accumulator than is necessary to maintain the desired temperature in the electrolytic cell, the major portion of this water being recirculated directly back to the boiler by the pump 42$^b$ and a smaller portion returned directly to the boiler feed compartment 18 through the steam trap 43.

The electrolytic treatment of the water in the cell in conjunction with the return of highly alkaline concentrated boiler water maintains sufficient alkalinity in the cathode compartment 16 of the electrolytic cell to cause such compounds as calcium carbonate and magnesium hydroxide, which are insoluble in the alkaline catholyte, to be precipitated in the cathode compartment. A portion of this precipitate is carried into the anode compartment and the remainder settles in the cathode compartment or in the settling compartment 17. The treated water delivered into the boiler feed compartment 18 has a low content of calcium and magnesium compounds. During the electrolytic treatment, corrosion producing materials such as soluble sulfates and chlorides concentrate in the anode compartment and are discharged through the anode discharge pipe 64 so as to substantially eliminate corrosion of boiler surfaces by the treated water.

A portion of the alkaline precipitate formed in the cathode compartment 16 is drawn into the anode compartment 54 through the aperture 63 along with alkaline water from the cathode compartment. Such precipitate is dissolved in the acid anolyte and in conjunction with the alkaline water from the cathode compartment tends to raise the pH in the anode compartment and thus reduce the amount of anode waste necessary to maintain a pH of the discharged anolyte above approximately 1.5. Any precipitate not carried into the anode compartment and settling in either the cathode compartment 16 or in the settling tank 17 may be discharged from time to time by opening the valves in the pipes 67 and 68, respectively. Similarly, any precipitate which might be carried over into the boiler supply compartment 18 and settling therein may be discharged from time to time through the pipe 69.

The treated water having a low content of scale forming materials as well as a low content of corrosion producing materials is withdrawn from the boiler supply compartment through the pipe 71 by the pump 24 and delivered into the coil 22 of the boiler 11. This water will contain a substantial amount of soluble sodium or other alkali metal compounds since alkali metal compounds are not precipitated by the electrolytic treatment and tend to concentrate in the system. The blower 26 and the burner 28 are started at the same time as the boiler feed pump 24 and water is heated in the boiler to a steam producing temperature. A mixture of steam and water is delivered into the accumulator 12. Steam is withdrawn through the pipe 51 and delivered to the load 19 and any condensate is returned to the boiler feed compartment through the pipe 42' so as to not pass through the electrolytic cell. This water is distilled water and merely recirculates in the boiler and load system.

Water collecting in the lower portion of the accumulator 12 is, however, concentrated boiler water in which the concentration of alkali metal compounds or any other soluble materials in the boiler feed water is increased over that of the water fed to the boiler. A portion of this water is returned to the mixing chamber 14 under control of the thermostatic valve 59. Make-up water continues to be fed into the mixing chamber 14 under control of the float valve 48 and the return of heated concentrated boiler water increases the temperature in the mixing chamber above that of the temperature of the raw water. The higher the temperature of the water in the electrolytic cell, the more efficient its operation. High temperatures, however, cause loss of heat by evaporation of water and also tend to cause disintegration of the anodes. The upper practical operating temperature of the water is approximately 160° F.

As indicated above, the efficiency of the cell decreases with decrease in temperature. The lower practical operating temperature is usually found to be about 80° F. although effective water treatment can be obtained at lower temperatures but with substantial increase in electric power consumption. The preferred range of temperatures is therefore between approximately 120° and 150° F. As soon as the temperature in the discharge end of the cathode compartment reaches a predetermined temperature which may be 140° F., the thermostatic valve 59 closes to discontinue the delivery of concentrated boiler water to the mixing chamber 14 and when the temperature in the discharge end of the cathode compartment decreases the thermostatic valve again opens.

The return of concentrated boiler water to the electrolytic cell not only increases the temperature therein but provides for conservation of soluble alkali metal compounds in the boiler system. The compounds thus conserved are highly alkaline and enable a high alkalinity to be more easily obtained in the cathode compartment 16, even with raw water having a very low content of alkali metal compounds, so as to precipitate calcium and magnesium compounds with a lesser consumption of electric power. The alkali metal compounds do not, however, build up excessively in the boiler system since catholyte containing such compounds is continually bled from the system through the anode compartment. A substantial amount of such compounds are carried out of the system with the anode waste through pipe 64. A balance is produced in the system such that the returned concentrated boiler water is maintained highly alkaline but excessive amounts of alkali metal compounds are discharged from the system.

If the demand for steam in the system of Fig. 1 is decreased, the pressure in the accumulator 12 increases to open the contacts of the pressure-operated relay and this deenergizes the operating coil of the relay 73 to stop the motor 27 to stop the feeding of water to the boiler and at the same time cutting off the supply of fuel. Simultaneously, the electric power supply to the electrolytic cell is discontinued and the supply of raw water cut off. If demand for steam again increases, the pressure drops in the accumulator 12 to again start up the system. The operation of the system may, of course, be completely discontinued by opening the manual switch 72.

Whenever the system is shut down, either manually or by the pressure-operated relay, anolyte continues to discharge through the pipe 64 and the upper end of the pipe 64 may be positioned sufficiently below the overflow aperture 57 that catholyte continues to flow into the anode compartment through the aperture 63 in sufficient amount to substantially neutralize anolyte therein. That is to say, the level in the treating tank 13 drops to the level of the upper end of the pipe 64 and during the dropping of this level catholyte flows into the anolyte compartment. This is of importance since the acidic anolyte is highly corrosive and also during shut-down periods will diffuse back into the cathode compartment to dissolve precipitate therein and increase the hardness of the water. When the anolyte is neutralized the cathode compartment remains filled with treated water up to the level set by the pipe 64 such that the system may be started up at any time and the treating tank 13 contains sufficient reserve supply of treated water to supply the boiler while additional make-up water is being treated in the electrolytic cell.

Figure 8:
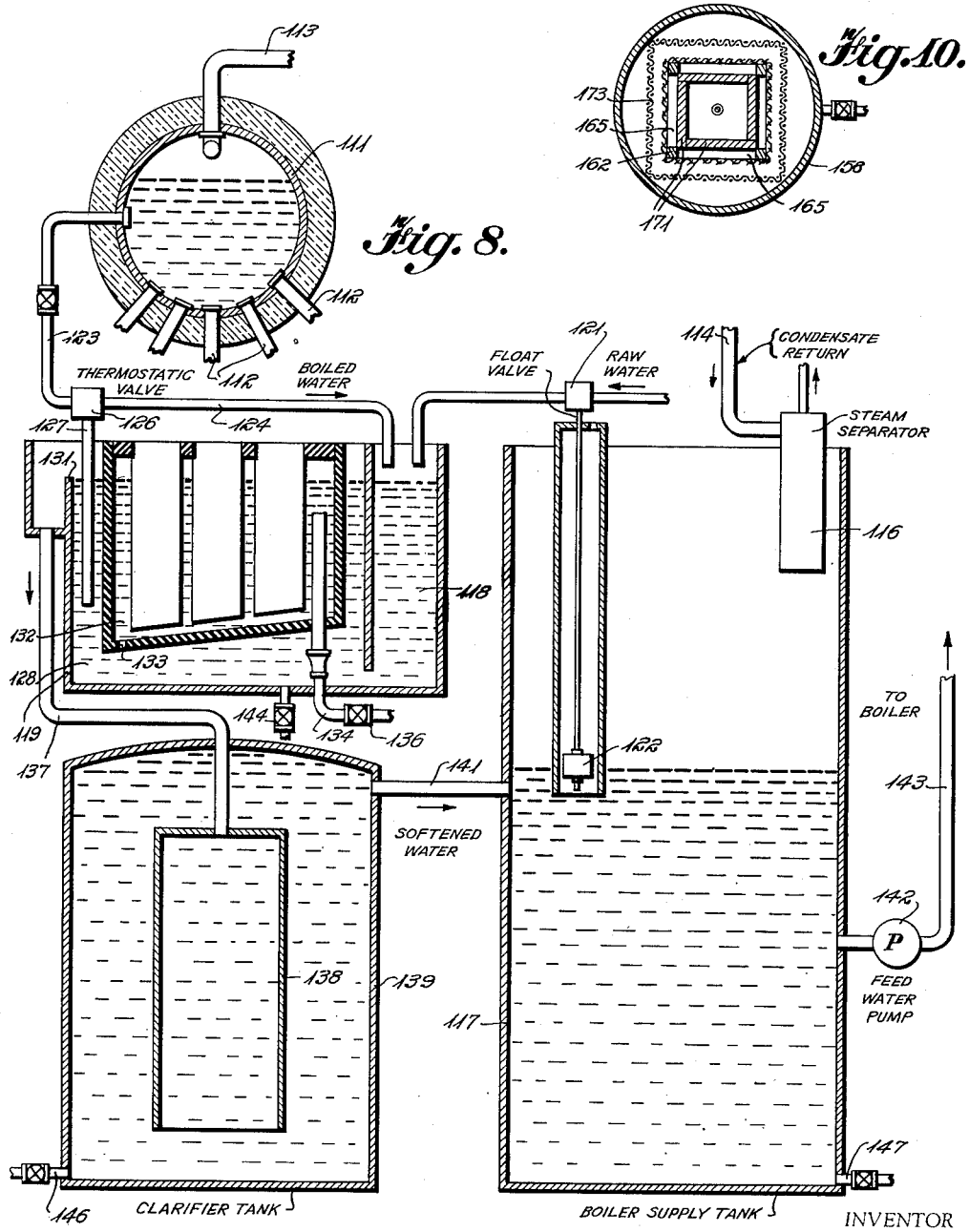
Fig. 8 is a view similar to Fig. 1 showing a portion of a system in accordance with the present invention as applied to a large scale boiler installation.

Fig. 8 illustrates a system similar to that of Fig. 1 but which is particularly adapted to large scale installations. The entire boiler structure is not shown in Fig. 8 but the drum 111 may be the accumulator or steam drum of a water tube boiler having a plurality of water tubes 112 connected at their upper ends to the drum 111. Steam may be withdrawn through the pipe 113 for any suitable use and if any condensate is recovered it may be returned through a condensate return pipe 114 through a steam separator 116 into a boiler supply tank 117. Raw water may be delivered into a mixing compartment 118 of an electrolytic treating tank 119 under control of a float valve 121 actuated by a float 122 in the boiler supply tank 117. Concentrated boiler water may be withdrawn from the drum through a pipe 123 and delivered through a pipe 124 into the mixing compartment 118 under control of a thermostatic valve 126 having a thermostatic element 127 in contact with water in the electrolytic cell. The mixture of raw water and boiler water flows from the mixing compartment 118 into the cathode compartment 128 and through this compartment and over a weir 131. It is subjected to cathodic treatment in the cathode compartment 128 and the temperature of the water discharging from this cathode compartment is controlled by the thermostatic valve 126. As in the system of Fig. 1, the anolyte is supplied to the anode compartment 132 through an aperture 133 between the anode and cathode compartments and anolyte is discharged from the anode compartment through a pipe 134 provided with an adjustable valve 136. For large scale operation, the electrolytic cell may contain a plurality of electrode and diaphragm structures such as the structures 86 of Figs. 2 to 7.

Treated water overflowing the weir 131 is delivered through a pipe 137 into the top of an inner vertically extending drum 138 having an opened lower end and positioned centrally in a closed clarifier or settling tank 139. Any precipitate formed in the cathode compartment and not drawn into the anode compartment 132 either settles in the cathode compartment 128 or settles in the tank 139, the inner drum 138 in the tank 139 providing a baffle structure to control the flow of treated water through the clarifier tank 139. The softened water from which any precipitate has settled overflows through a pipe 141 in the boiler supply tank 117 and may be withdrawn therefrom by a feed water pump 142 and delivered through a pipe 143 to the boiler as boiler feed water.

Operation of the system of Fig. 8 is generally similar to that of Fig. 1 in that insoluble calcium and magnesium compounds are precipitated from the raw water under optimum temperature conditions and in the presence of returned concentrated boiler water and acidic materials are discharged from the system. As in Fig. 1, soluble alkali metal compounds which are highly alkaline build up in the circulating system but continued bleeding of waste anolyte from the system carries a substantial amount of such compounds out of the system to prevent too high a concentration thereof. The return of concentrated boiler water to the electrolytic cell accomplishes all of the desirable functions discussed with respect to Fig. 1, and in addition, provides a continual blow down of the boiler so that any solids precipitated in the boiler and maintained in suspension in the boiler water due to agitation by steam formation are largely withdrawn from the boiler and settle out in either the cathode compartment 128 or the clarifier tank 139. Such solids along with any precipitate formed in the cathode compartment of the electrolytic treating cell and settling in the various tanks may be discharged or washed out intermittently through suitable drain connections such as 144, 146 and 147.

Figure 9:
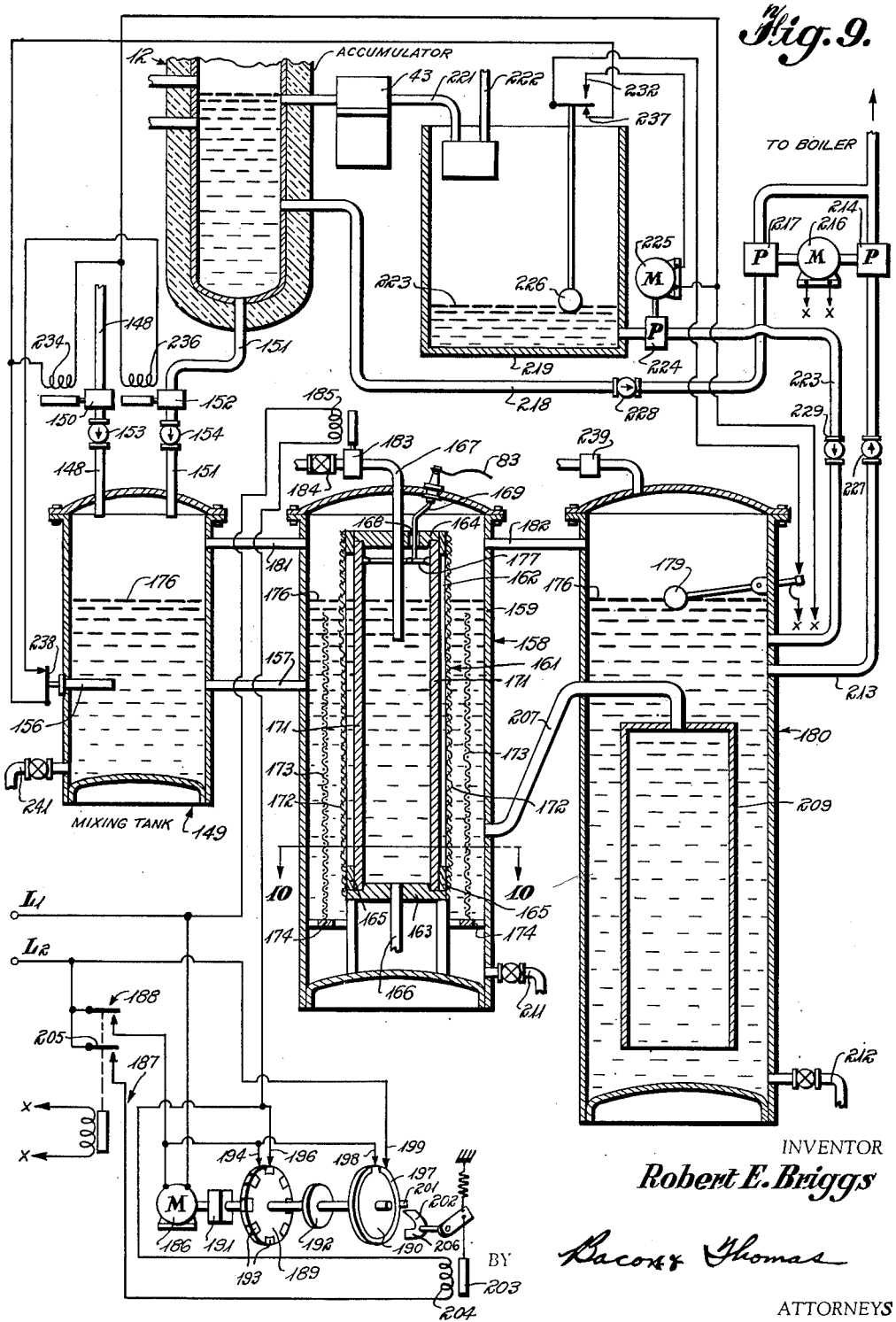
Fig. 9 is a view similar to Fig. 1 showing a portion of a boiler system in which the water being treated is maintained under pressure.

The two systems for treating boiler water above described have been open systems, but it is entirely possible to treat the incoming feed water in admixture with concentrated boiler water in a closed system operating substantially at the pressure of the water mains supplying the feed water. In Fig. 9, the entire boiler system is not shown, but may include a boiler having an accumulator 12 which may be identical with the accumulator of Fig. 1. Raw water may be fed to the system from a pipe 148 and be delivered into a mixing tank 149 above the level of the water therein under control of a solenoid operated valve 150. Concentrated boiler water at an elevated temperature may be withdrawn from the accumulator 12 through a pipe 151 under control of a solenoid operated valve 152 and delivered into the mixing tank 149 also above the water level therein. Both the pipes 148 and 151 may be provided with check valves 153 and 154, respectively, to prevent reverse flow.

The solenoid operated valve 152 may be under control of a thermostatic element 156 positioned in the mixing tank 149, as later described, so that the valve 152 is opened only when the temperature of the water in the mixing tank decreases below a predetermined value and is closed when the temperature of the water in the mixing tank increases above a predetermined value. The operation of both the solenoid valves 150 and 152 is also controlled by the water level in the system including the mixing tank 149 as later described. A mixture of raw water and concentrated boiler water at substantially a constant temperature is produced and delivered through a pipe 157 into a closed electrolytic treating cell 158.

The electrolytic cell 158 may have a closed casing 159 made of any suitable metal such as iron or steel and may have an anode and diaphragm structure 161 positioned therein. The anode and diaphragm structures may have a framework of insulating or poorly conducting material, such as wood, made up of upright corner elements 162 held in spaced relation with respect to each other by a bottom member 163 and a top member 164 and cross-members 165. The bottom member 163 may be spaced from the bottom of the casing 159 and may be solid except for a central aperture through which an anolyte supply pipe 166 may extend. The top member 164 may also be of solid construction except for an aperture through which an anolyte discharge pipe 167 extends, and an aperture 168 through which a lead 169 for making electrical connection to the anodes extends. Suitable anodes 171 may be supported in recesses provided between the bottom member 163 and the cross members 165 and between the top member 164 and cross members 165. A flexible diaphragm 172 made of suitable material, such as canvas, may be wrapped around the corner members 162 to provide an anode chamber closed by the diaphragm 172 and the bottom member 163. A suitable cathode 173, preferably made of iron wire screen, may be positioned in the casing 159 so as to surround and be spaced from the diaphragm 173. For example, the cathode 173 may rest upon a metal ring 174 secured to the interior of the casing 159 near its lower portion and also serving to center the lower portion of the anode and diaphragm structure 16. The cathode may be clamped or welded to the casing 159 or ring 174 to insure grounding of the cathode to the casing 159.

The anodes 171 and diaphragm structure 161 may extend above the liquid level 176 in the casing 159 so that the upper ends of the anodes 171 also extend above this liquid level. This provides for electrical connection to the anodes above the liquid level. It is difficult to make electrical connection to completely submerged anodes as the electrolytic action rapidly corrodes any metal parts which are in contact with the anolyte. Although it is possible to make electrical connection to submerged anodes by completely covering the conductors with liquid-impervious insulating materials, a much simpler structure results if the anodes extend above the liquid level. Suitable conductors 177 positioned above the liquid level may then be secured to the anodes and the common conductor 169 may extend through a wall of the casing 159 by employing an insulated bushing 178.

The liquid level 176 in the casing 159 may be maintained at substantially a predetermined level by a float 179 positioned in a settling tank 180 as later described. The level 176 is maintained the same in the mixing tank 149, the electrolytic cell 158 and the settling tank 180 by connecting pipes 181 and 182 above the liquid level.

Withdrawal of waste analyte through the pipe 167 is preferably accomplished intermittently. That is to say, the amount of anolyte withdrawn is relatively small and the pressure in the treating system makes it difficult to manually adjust a constantly open valve which will correctly regulate the discharge of waste anolyte. However, by intermittently discharging the anolyte, for example, by control of a solenoid operated valve 183, a manually adjustable valve 184 can be employed with the solenoid operated valve to accurately control the discharge of anolyte. Any suitable timing mechanism may be employed for energizing the operating coil 185 of the solenoid valve 183, one type of timing mechanism being illustrated in Fig. 9. This timing mechanism may include a small electric motor 186 receiving power from the line conductors $L_1$ and $L_2$ which may be the same as the line conductors $L_1$ and $L_2$ of Fig. 1. A relay 187 which may be energized through the conductors X—X of Fig. 1, under control of a pressure operated relay, such as the relay 77 shown in Fig. 1, may have its normally open contacts 188 in series with one conductor to the motor 186. Thus when the relay 187 is closed the motor 186 operates to drive a pair of contact discs 189 and 190 through a speed reducing mechanism 191, the disc 190 being rotated through a friction drive indicated at 192.

The contact disc 189 may be provided with spaced contacts 193 adapted to intermittently close a circuit between spaced brush members 194 and 196. These brush members are in a series circuit including the operating coil 184 of the solenoid valve 183. This circuit may be traced from line conductor $L_2$ through the contacts 188 of relay 187, brush 194, a contact 193, brush 196, solenoid winding 185 and back to line conductor $L_1$. It will be apparent that rotation of the disc 189 will cause intermittent opening and closing of the solenoid valve 183.

It is desirable to continue the anolyte discharge for a predetermined period of time after the system has been shut down in order to fill the anode compartment with catholyte during shut down periods. The disc 190 may be provided with an annular contact member 197 having a gap therein and is shown in the position it assumes during complete shut down after discharge of anolyte has been discontinued. A pair of brush elements 198 and 199 are adapted to engage the contact member 197 and when both of these brush elements make contact with the contact member 197, a circuit shunting the contacts 188 of relay 187 is completed. The disc 190 may be provided with a detent member 201 adapted to be engaged by a pawl on a pivoted pawl member 202. In the position of the pawl member shown, the disc is held in a position opening the circuit including brush elements 198 and 199. The pawl member 202 is actuated by a solenoid having a plunger 203 actuated by an operating coil 204. The operating coil 204 is connected in series with normally open contacts 205 of the relay 187.

When the system is started up, the relay 187 closes to start the motor and energize the solenoid coil 204 to pivot the pawl member and allow the disc 190 to rotate and close the circuit across the contacts 188 of relay 187 through brush elements 198 and 199. The solenoid coil 204 remains energized and the detent member 201 strikes a second pawl 206 on the pawl member 202 to stop the disc 190 in a position maintaining the circuit through the brush members 198 and 199.

When the system is shut down, relay 187 is deenergized to open contacts 205 of this relay. This deenergizes the operating coil 204 to return the pawl member 202 to its original position and again release the detent member 201. The motor 186 continues to operate as its circuit is closed through the brush members 198 and 199 and the contact member 197. The discs 189 and 190 continue to rotate and cause intermittent opening and closing of the solenoid valve 183 until the detent member 201 of disc 190 again strikes pawl member 202 at which time the motor circuit is opened. The timing mechanism just described therefore continues the discharge of anolyte from the system after the rest of the system has been shut down so as to fill the anolyte compartment with alkaline water from the cathode compartment, the level 176 in the cell 158 and tanks 149 and 180 falling to a somewhat lower level during the continued discharge of anolyte.

Treated water from the cell 158 may be discharged therefrom through a pipe 207 into the settling tank 180. This treated water is preferably directed into the top of an internal vertically extending drum 209 having an open bottom and providing a baffle structure to control the flow of treated water through the tank 180. Any precipitate formed in the cathode compartment of the cell 158 settles therein or in the tank 180 and suitable drain connections 211 and 212 may be provided for the cell 158 and tank 180, respectively, so that the precipitate may be flushed therefrom from time to time. At least a portion of such precipitate is, however, drawn into the anode compartment through the pipe 166 and is discharged in the acidic anolyte.

Treated water from which the precipitate has been settled may be withdrawn from the settling tank 180 through a pipe 213 by means of a feed water pump 214. The feed water pump may be driven by a motor 216 which may also drive a recirculating pump 217 which returns concentrated boiler water from the accumulator 12 through a pipe 218 directly to the boiler along with feed water from the tank 180.

Any concentrated boiler water escaping from the accumulator 12 through the steam trap 43 may be delivered into a condensate tank 219 through a pipe 221 and also any condensate returned from the load through the pipe 222 may be collected in the condensate tank 219. The water collecting in the tank 219 may be pumped directly back into settling tank 180 through a pipe 223 by means of a pump 224 driven by a motor 225 under control of both the float 179 in the settling tank 180 and a float 226 in the condensate tank 219. The pipes 213, 218 and 223 may have check valves 227, 228 and 229, respectively, therein to prevent reverse flow.

The motor 216 for the pumps 214 and 216 may receive its electrical power from the conductors X, X of Fig. 1 and the electrolytic cell 158 may be energized in the same manner as the open cell of Fig. 1, i. e., it may be energized from the conductors 82 and 83 of Fig. 1. The electrical system for controlling the operation of the motor 225 and solenoid valves 150 and 152 in Fig. 9 may also receive its electric power from the conductors X, X of Fig. 1 so as to be under control of the pressure operated relay 77 of Fig. 1. One of the conductors X of Fig. 9 may be connected in series with the contacts 231 operated by the float 179. These contacts are opened when the float 179 is in the position shown so that the motor 225 cannot be driven nor the solenoid valves 150 and 152 opened until the float 179 falls below the level 176 due to decrease of liquid level in the tank 180. That is to say, no liquid can be introduced into the mixing tank 149 until the liquid level falls below the liquid level 176. One of the leads to the motor 225 is also in series with the upper contact 232 actuated by the float 226 in the condensate tank 219. That is to say, the motor 225 can also not be driven unless the float 226 is carried above the position shown by an increasing liquid level 233. One of the leads to the operating coils 234 and 236 for the solenoid valves 150 and 152, respectively, is connected in series with the lower contact 237 actuated by the float 226 so that the solenoid valves cannot be opened until the liquid level in the tank 219 falls to approximately the level 233. Contact 237 does not, however, open until after contact 232 has closed so that either the pump 224 driven by the motor 225 or the solenoid valve 150 is always conditioned to introduce water under control of the float 179 into one of the tanks 180 or 149 when the liquid level falls therein. One of the leads to the operating coil 236 of solenoid valve 152 for heated concentrated boiler water is also connected in series with the contacts 238 actuated by the thermostatic element so that the valve 152 cannot be opened until the temperature of the water in the mixing tank 149 exceeds a predetermined temperature.

The electrical system just described operates as follows. When the pump 214 withdraws water from the tank 180, the liquid level falls therein to cause the float 179 to close the contacts 231. If the water level in the tank 219 is sufficiently high to cause the float to close contacts 232 and open contacts 237, the motor 225 drives the pump 224 to deliver water into the tank 180 to increase the liquid level therein and no water is introduced into the mixing tank through the valves 150 and 152. When the liquid level in tank 219 falls sufficiently to cause the float 226 to close contacts 237, raw water can be introduced into the mixing tank 149 through solenoid valve 150 and if the temperature in the tank 149 is sufficiently low contacts 238, actuated by thermostat 156, will also be closed to enable solenoid operated valve 152 to also supply heated concentrated boiler water to the mixing tank 149. If the liquid level in tank 219 continues to fall, contacts 232 will be opened to stop motor 225 and pump 224 until the level in tank 219 increases due to return of condensate or overflow from accumulator 12. Thus raw water is introduced into the system only when the tank 219 is nearly emptied and heated concentrated boiler water is introduced into the mixing tank 149 under control of thermostat 156 only when raw water is being introduced. The introduction of water into either the settling tank 180 or the mixing tank 149 is at all times under the control of float 179 so that the water level in the cell 158 and associated tanks does not increase above the level 176.

The electrolytic cell generates gases during its operation and these gases must be allowed to escape as otherwise the pressure would build up in the cell 158 and associated tanks to an undesirable value. The gases may, however, be vented to atmosphere through a pressure release valve 239 which may, for example, be connected to tank 180 above the liquid level therein. The pressure relief valve may be set to maintain the pressure in the cell and tanks 149 and 180 just below the pressure in the water mains or other system supplying the raw water or at any desired lower pressure.

The pipes 148 and 151 for introducing raw water and heated concentrated boiler water preferably terminate in the mixing tank 149 above the liquid level 176 therein. When the raw water and concentrated boiler water are brought into contact, a precipitate usually forms and scale will usually form in the pipes where the two types of water come together. Such scale may be sufficient to plug the outlet of the pipe but by positioning the entrance ends of the pipes in the gas space above the liquid level in the tank 149 so that the two types of water are sprayed into the tank, this scaling is avoided. Any precipitate which forms in the tank 149 is either carried into the cell 158 to settle therein or in tank 139 or settles in tank 149. A drain 241 may be provided for tank 149 to enable such settled precipitate to be withdrawn when desired. Otherwise the operation of the systems of Fig. 9 is essentially similar to the operation of the systems of Figs. 1 and 8. That is to say, concentrated boiler water is recycled in the system to conserve alkaline compounds so as to increase the alkalinity of the water delivered to the treating cell. This concentrated boiler water is also employed to increase the temperature in the treating cell.

In addition to removing the most common scale producing materials such as magnesium and calcium and removing corrosion producing materials such as sulfates and chlorides, the present process also removes a considerable quantity of silica, iron and manganese. All of these materials are easily removed in a single step whereas chemical treatments to reduce the content of all of such materials involve a plurality of treatments and much more complicated and expensive apparatus. The present process has also been found to be effective to remove at least a portion of the organic material present in some raw waters and it has also been found that water treated in accordance with the present invention is substantially free from dissolved oxygen.

It is apparent that the present process does not completely eliminate dissolved solids from the boiler feed water. Such dissolved solids are, of course, concentrated in the water in the boiler. Too high a concentration of dissolved solids in the boiler ordinarily produces foaming in the boiler. The upper limit of dissolved solids content in the boiler water is, therefore, set by the concentration which produces foaming. The concentration which produces foaming, however, also depends upon the nature of the dissolved solids. With chemically treated boiler waters, the dissolved solids in the feed water usually include substantial amounts of sulfates or chlorides and the maximum concentration of dissolved solids in the boiler water which can be tolerated is usually in the neighborhood of 3500 p. p. m., although in some cases, this may be as high as 5500 p. p. m. With waters treated in accordance with the present invention where the boiler feed water is relatively free of chlorides and sulfates and the main constituents are alkaline compounds, concentrations as high as 8000 p. p. m. are possible. As a practical matter, it is usually desirable to operate the system such that the concentration of dissolved solids in the returned concentrated boiler water (blowdown water) does not exceed 7000 p. p. m., i. e., so that the water in the accumulator or in the boiler itself does not have a concentration exceeding 7000 p. p. m.

When a system operating in accordance with the present invention reaches a balanced condition such that the electrolytic cell is operating near maximum efficiency and a substantial amount of blowdown water is recycled through the treating cell, the concentration of dissolved solids in the blowdown water can be regulated by regulating the amount of anolyte waste. Increasing the anolyte waste increases the amount of dissolved solids discharged from the system and correspondingly increases the pH in the anode compartment of the cell. By employing an electrolytic cell of the proper capacity, the pH in the anode compartment may, however, be maintained close to but above approximately 1.5. In processes employing the usual chemical treatment of boiler feed water the blowdown water is all sent to waste as returning it to the system would cause a concentration of undesirable materials in the system.

As a comparison of the amount of waste in the usual chemical treatment processes of boiler water and in electrolytic treatment processes in accordance with the present invention, a raw water containing about 500 p. p. m. total dissolved solids can be assumed where the scale forming materials are largely calcium and magnesium present as bicarbonates, carbonates and sulfates. Such water may also contain small amounts of chlorides and small amounts of sodium compounds. With the usual chemical treatment of the water using lime or soda or both and assuming that 400 gallons of water are converted into steam per hour with no condensate return, the blowdown water from the boiler will usually be in the neighborhood of 40 gallons per hour. This blowdown water is sent to waste. With a system in accordance with the present invention, the only water sent to waste is that from the anode compartment. Under the same conditions of steam production assumed above, this waste will usually be considerably less than 20 gallons per hour and may be as low as 5 gallons per hour and the waste water will be at a much lower temperature than the blowdown water thus carrying less heat out of the system.

In general, the water being treated in the cathode compartment in accordance with the present invention should remain therein for at least 10 or 15 minutes. Leaving the water being treated in the cathode compartment for a longer period than required has no deleterious effect on the water but merely results in the unnecessary consumption of electric power in electrolytically decomposing water.

This application is a continuation-in-part of my copending application Serial No. 591,195, filed April 30, 1945, now Patent No. 2,535,035 granted December 26, 1950 and of my copending application Serial No. 694,489, filed September 3, 1946 now Patent No. 2,546,254 granted March 27, 1951.

I claim:

1. The process of treating boiler water, which comprises, introducing raw water containing soluble scale producing materials into the cathode compartment of a two compartment electrolytic cell having a porous diaphragm separating said cathode compartment from an anode compartment and having a cathode in said cathode compartment and an insoluble anode positioned in an aqueous anolyte in said anode compartment, simultaneously introducing heated highly alkaline concentrated boiler water into said cathode compartment in sufficient amount to produce a temperature of the water in said cathode compartment between approximately 80° and 160° F., the resulting mixture of waters forming the catholyte, passing direct current between said anode and said cathode to electrolytically treat said catholyte in said cathode compartment to increase the alkalinity thereof and produce a precipitate of compounds of scale producing materials insoluble in the alkaline catholyte, separating treated water from said precipitate to produce a treated water containing soluble alkaline compounds, utilizing said separated treated water as boiler feed water, whereby said alkaline compounds are concentrated in said boiler feed water by evaporation of water therefrom to produce said concentrated boiler water for introduction into said cathode compartment, delivering water containing a portion of said precipitate from said cathode compartment into said anode compartment through a constantly open conduit to provide said anolyte, said anolyte becoming acidic by electrolytic treatment in said anode compartment so as to dissolve said portion of said precipitate, discharging acidic anolyte from said process, and controlling the discharge of said anolyte to control the delivery of water from said cathode compartment into said anode compartment and maintain the pH of the anolyte discharged from said anode compartment above approximately 1.5.

2. The process of treating boiler water in a direct current electrolytic diaphragm cell having anode and cathode compartments, comprising, simultaneously flowing raw water and highly alkaline concentrated boiler water into said cathode compartment, passing current between said anode and cathode to increase the alkalinity of said waters to form a precipitate, separating said alkalized water from said precipitate, flowing said separated water to a boiler, and returning highly alkaline concentrated water from said boiler to said cathode compartment.

3. The process of treating boiler water in an electrolytic diaphragm cell having anode and cathode compartments, comprising, simultaneously flowing raw water and highly alkaline concentrated boiler water into said cathode compartment, passing current from said anode to said cathode to alkalize said waters and to form a precipitate, separating said alkalized water from said precipitate, flowing said separated water to a boiler wherein it is concentrated, and flowing a portion of said concentrated water to said cathode compartment.

4. The process of treating boiler water, which comprises, introducing raw water into the cathode containing compartment of a direct current electrolytic cell having a diaphragm separating said cathode compartment from an anode containing compartment, simultaneously introducing highly alkaline concentrated boiler water into said cathode compartment, the resultant mixture of waters forming the catholyte, passing current between said anode and cathode to electrolytically treat said catholyte to increase the alkalinity thereof and precipitate scale producing compounds, separating treated water from said precipitate, flowing said separated treated water to a boiler and returning highly alkaline water from said boiler to said cathode compartment.

5. The process of treating boiler water in a direct current electrolytic diaphragm cell having anode and cathode compartments, comprising, simultaneously flowing raw water and highly alkaline concentrated boiler water into said cathode compartment, passing current between said anode and cathode to increase the alkalinity of said waters and to form a precipitate, separating said alkalized water from said precipitate, flowing said separated water to a boiler, returning highly alkaline concentrated water from said boiler to said cathode compartment, delivering water from said cathode compartment to said anode compartment to provide an anolyte, and discharging anolyte from the process.

6. The process of treating boiler water in a direct current electrolytic diaphragm cell having anode and cathode compartments, comprising, simultaneously flowing raw water and highly alkaline concentrated boiler feed water into said cathode compartment, passing current between said anode and cathode to increase the alkalinity of said waters and to form a precipitate, separating said alkalized water from said precipitate, flowing said separated water to a boiler, returning highly alkaline concentrated water from said boiler to said cathode compartment, delivering water containing a portion of said precipitate from said cathode compartment into said anode compartment through a constantly open conduit to provide an anolyte, said anolyte becoming acidic by electrolytic treatment so as to dissolve said portion of said precipitate, discharging acidic anolyte from the process, and controlling the discharge of said anolyte to control the delivery of water from said cathode compartment into said anode compartment.

7. The process of treating boiler water in an electrolytic diaphragm cell having anode and cathode compartments, comprising, flowing raw water into said cathode compartment, simultaneously flowing heated highly alkaline concentrated boiler water into said cathode compartment in sufficient amount to produce a temperature of the water in said cathode compartment between approximately 80° and 160° F., the resulting mixture of waters forming the catholyte, passing current from said anode to said cathode to increase the alkalinity of said catholyte and to form a precipitate, separating treated water from said precipitate to produce a treated water containing soluble alkaline compounds, flowing said treated water to a boiler wherein said alkaline compounds are concentrated to produce concentrated boiler water, flowing at least a portion of said concentrated boiler water into said cathode compartment, and discharging from said process a portion of water containing said alkaline compounds.

8. The process of treating boiler water, which comprises, introducing raw water containing soluble scale producing compounds into the cathode compartment of an electrolytic cell having a diaphragm separating said cathode compartment from an anode compartment and having a cathode in said cathode compartment and an insoluble anode positioned in an aqueous anolyte in said anode compartment, simultaneously introducing highly alkaline concentrated boiler water into said cathode compartment, the resulting mixture of waters forming the catholyte, passing direct current between said anode and said cathode to electrolytically treat said catholyte in said cathode compartment to increase the alkalinity thereof and produce a precipitate of scale producing compounds insoluble in the alkaline catholyte, separating treated water from said precipitate to produce a treated water containing soluble alkaline compounds, introducing said separated treated water into a boiler whereby said alkaline compounds are concentrated in said boiler water by evaporation of water therefrom to produce said concentrated boiler water for introduction into said cathode compartment.

References Cited in the file of this patent

UNITED STATES PATENTS

| Number | Name | Date |
|---|---|---|
| 2,341,356 | Briggs | Feb. 8, 1944 |
| 2,535,035 | Briggs | Dec. 26, 1950 |
| 2,546,254 | Briggs | Mar. 27, 1951 |

OTHER REFERENCES

"Metallic Corrosion, Passivity, and Protection," by Evans, published in 1946, pages 577 and 578.